(12) United States Patent
Kinghorn

(10) Patent No.: US 11,953,270 B2
(45) Date of Patent: Apr. 9, 2024

(54) GAS-LIQUID SEPARATOR

(71) Applicant: LEONARDO MW LIMITED, Essex (GB)

(72) Inventor: Anthony Kinghorn, Essex (GB)

(73) Assignee: LEONARDO UK LTD, London (GB)

(*) Notice: Subject to any disclaimer, the term of this patent is extended or adjusted under 35 U.S.C. 154(b) by 588 days.

(21) Appl. No.: 17/268,762

(22) PCT Filed: Aug. 19, 2019

(86) PCT No.: PCT/EP2019/072190
§ 371 (c)(1),
(2) Date: Feb. 16, 2021

(87) PCT Pub. No.: WO2020/035624
PCT Pub. Date: Feb. 20, 2020

(65) Prior Publication Data
US 2022/0111312 A1    Apr. 14, 2022

(30) Foreign Application Priority Data

Aug. 17, 2018  (GB) ..................... 1813420

(51) Int. Cl.
*F28D 15/06*    (2006.01)
*B01D 19/00*    (2006.01)
(Continued)

(52) U.S. Cl.
CPC ......... *F28D 15/06* (2013.01); *B01D 19/0042* (2013.01); *B01D 19/0063* (2013.01);
(Continued)

(58) Field of Classification Search
CPC ...... B01D 1/22; B01D 19/00; B01D 19/0042; B01D 19/0063; B64G 1/50; B64G 1/506;
(Continued)

(56) References Cited

U.S. PATENT DOCUMENTS 4,600,413 A    7/1986  Sugden
4,997,464 A    3/1991  Kopf
(Continued)

FOREIGN PATENT DOCUMENTS

JP    2000065456 A    3/2000
JP    2017100560 A    6/2017
(Continued)

OTHER PUBLICATIONS

European Search Report for GB 1813420.5 dated Dec. 19, 2018.
(Continued)

*Primary Examiner* — Eric S Ruppert
*Assistant Examiner* — Hans R Weiland
(74) *Attorney, Agent, or Firm* — BUCHANAN INGERSOLL & ROONEY PC

(57) ABSTRACT

A gas-liquid separator includes a chamber having an inlet for liquid to enter and at least one outlet for expulsion gas and/or vapour that has separated from the liquid within the chamber under gravity. For some applications the chamber will also have an outlet for the liquid. These systems can rely on the chamber remaining in a static orientation with the gas outlet arranged uppermost. Exemplary embodiments provide the chamber with multiple spaced apart outlets and an ability to sense orientation and/or acceleration of the chamber. A controller uses the output of the sensors to determine the spatial arrangement of the liquid phase and gas phase within the chamber relative to the outlets and selectively opens the multiple outlets to allow one of the liquid phase or gas phase to escape the chamber in preference to the other.

13 Claims, 1 Drawing Sheet

Figure 1:
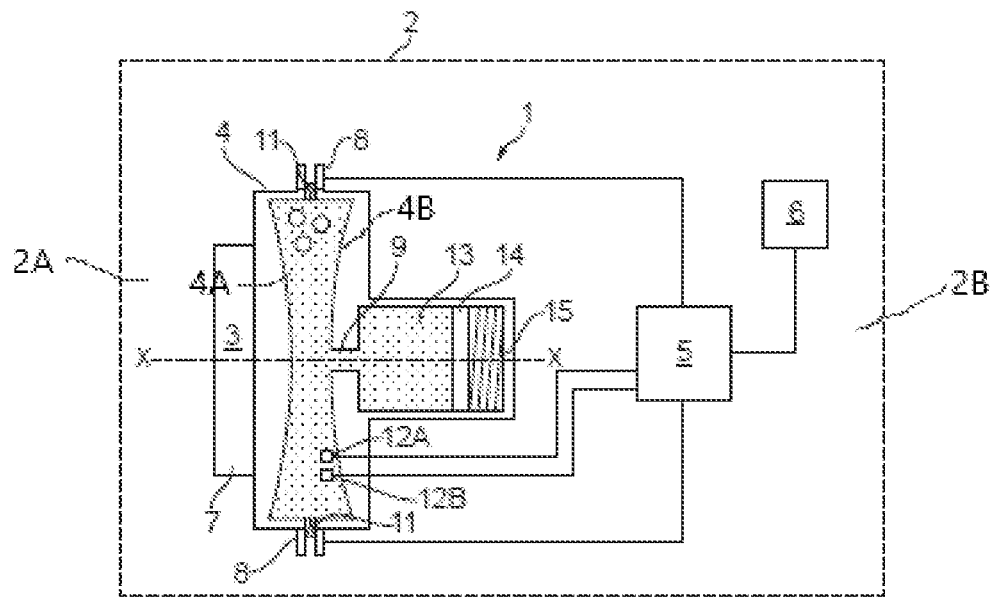

(51) Int. Cl.
  *F28D 15/02* (2006.01)
  *B64G 1/50* (2006.01)
  *F28D 21/00* (2006.01)

(52) U.S. Cl.
  CPC ...... *B64G 1/506* (2013.01); *F28D 2015/0216* (2013.01); *F28D 2021/0021* (2013.01)

(58) Field of Classification Search
  CPC .. F28D 15/02; F28D 15/06; F28D 2015/0216; F28D 2021/0021; F28D 2021/0028; F28D 2021/0029
  See application file for complete search history.

(56) References Cited

U.S. PATENT DOCUMENTS

| | | | |
|---|---|---|---|
| 5,868,119 A | 2/1999 | Endo et al. | |
| 10,259,314 B2 | 4/2019 | Aso et al. | |
| 2010/0021778 A1 | 1/2010 | Steinshnider et al. | |
| 2010/0259889 A1* | 10/2010 | Chen | G06F 1/203 361/679.48 |
| 2013/0081779 A1* | 4/2013 | Liao | G05D 23/19 165/11.1 |
| 2013/0082010 A1 | 4/2013 | Al-mulhim et al. | |
| 2014/0041827 A1* | 2/2014 | Giaimo, III | G06F 1/203 165/200 |
| 2014/0260993 A1 | 9/2014 | Elms et al. | |
| 2015/0029658 A1* | 1/2015 | Yairi | H05K 7/20272 361/679.47 |
| 2015/0034278 A1* | 2/2015 | Rhoden | F28D 15/0275 29/890.032 |
| 2017/0151867 A1 | 6/2017 | Aso et al. | |
| 2018/0292871 A1* | 10/2018 | Weigand | G06F 1/203 |
| 2022/0065548 A1* | 3/2022 | Haruki | F28D 15/0266 |
| 2022/0236777 A1* | 7/2022 | Andrews | G06F 1/1677 |

FOREIGN PATENT DOCUMENTS

| | | |
|---|---|---|
| WO | 2014064450 A1 | 5/2014 |
| WO | 2016159056 A1 | 10/2016 |

OTHER PUBLICATIONS

European Search Report for GB 1911886.8 dated Jan. 2172020.
International Search Report (PCT/ISA/210) and Written Opinion (PCT/ISA/237) dated Sep. 26, 2019, by the European Patent Office as the International Searching Authority for International Application No. PCT/EP2019/072190.
First Office Action dated Jan. 25, 2022, by the Japanese Patent Office in corresponding Japanese Patent Application No. 2021-532524, and an English Translation of the Office Action. (8 pages).

* cited by examiner

GAS-LIQUID SEPARATOR

The present invention relates to a gas-liquid separator.

Gas-liquid separators are used in a wide variety of applications including phase change cooling devices. A known example of a gas-liquid separator comprises a chamber having an inlet in which a liquid enters the chamber, and at least one outlet for expulsion of gas and/or vapour that has separated from liquid within the chamber under gravity. For some applications the chamber will also have an outlet for the liquid. These systems typically rely on the chamber remaining in a static orientation with the gas outlet arranged uppermost. This makes a gas-liquid separator unsuitable for applications where the chamber experiences frequent changes in orientation and large acceleration forces such as on an airborne or submarine platform.

According to a first aspect of the invention there is provided apparatus comprising: a gas-liquid separator chamber for holding a gas-liquid mixture; the chamber comprising multiple spaced apart outlets; sensing means that provides an output indicative of the orientation and/or acceleration of the chamber; and control means that uses the output of the sensing means to determine an indication of the spatial arrangement of the separated liquid phase and gas phase of the gas-liquid mixture within the chamber relative to the outlets and to selectively open one or more of the multiple outlets to allow one of the liquid phase or gas phase to escape from the chamber in preference to the other.

Use of the invention makes it possible to compensate for changes in the orientation and direction of acceleration of the chamber that affect the relative spatial relationship of the gas and liquid in the chamber, thus making it possible to use a gas-liquid separator on an airborne or submarine platform.

The control means may selectively open one or more outlets determined to be immediately adjacent the gas phase in order to allow the gas to escape in preference to the liquid. The control means may selectively open one or more outlets determined to be immediately adjacent the liquid phase in order to allow the liquid to escape in preference to the liquid.

A separate valve may be associated with each outlet. Under control of the control means, each valve may be switchable independently from the other valves between a closed position and open position in order to provide independent control of fluid flow through its respective outlet.

The sensing means (e.g. one or more sensors) may comprise an accelerometer, favourably a tri-axis accelerometer implemented, for example, using a micro electro-mechanical system. A micro electro-mechanical system is a favourable implementation for an accelerometer as they are widely available, cheap and small. Nevertheless, it is possible that other types of sensor may be used to determine orientation and/or acceleration such as, for example, a liquid capacitive inclinometer.

At least two of the outlets may be arranged on different, e.g. opposite, sides of the chamber so that gas or liquid can be evacuated selectively from either of the different sides of the chamber. The outlets may be circumferentially spaced around the chamber.

The chamber may comprise an inlet for the liquid phase of the gas-liquid mixture to enter the chamber. The inlet may be proximate to the centre of the chamber compared with the multiple outlets. In other words the outlets may be arranged radially outward from the centre of the chamber relative the inlet. This allows for the fluid to be introduced into the chamber irrespective of the relative orientation of the chamber and spatial relationship between the liquid and gas within the chamber.

The apparatus may comprise a reservoir in fluid communication with the chamber, e.g. via inlet, the reservoir holding liquid to be introduced into the chamber to replenish fluid which is lost through the multiple outlets.

The apparatus may comprise a pressurising means to pressurise the fluid within the chamber. In one example the apparatus may comprise a piston biased by a spring, arranged to exert pressure against the liquid in the reservoir which, as a result of its open communication with the chamber also pressurises the fluid in the chamber. This can be used to ensure that the chamber is filled with liquid prior to gas formation, and replenishes the chamber with liquid automatically in response to purging of gas/vapour. When the apparatus is used as a cooling device, it allows the boiling temperature of the fluid within the chamber to be maintained or altered (e.g. by changing the pressure exerted by the actuator).

The spring biased piston may be used to ensure the chamber remains largely filled with liquid. It may be used to ensure the chamber is completely filled with liquid prior to gas formation, however this is not preferred as the extremely limited compressibility of liquids lead to the need for very high pressures in the chamber for boiling to occur.

The inlet may allow for two way flow of fluid between the chamber and reservoir such that liquid can also flow from the chamber to the reservoir. This allows fluid to flow out of the chamber in response, for example, to an increase in temperature within the chamber so that a designated pressure within the chamber can be maintained.

An inside facing surface of the chamber may be profiled to direct fluid towards an outlet. This, for example, helps to ensure gas pockets or vapour cavities that form in the chamber as a result of liquid-gas separation are guided to an outlet so that they can be expelled from the chamber. The inside facing surface of the chamber may be profiled to provide, for each outlet, a channel to guide gas/vapour towards the outlet.

The internal surface of the chamber may be provided with a coating that is rough at the nano scale to enhance heat transfer to the working fluid. A nano-structure surface provides a greater surface area to provide improves heat transfer. Such a structure may also promote heterogeneous nucleation within the chamber so as to promote the formation of gas/vapour cavities within the working liquid in the chamber to reduce occurrence of superheating of the liquid phase.

In one arrangement, for applications where is it desirous to draw both gas and liquid from the chamber, the apparatus may comprise a liquid outlet path and a gas outlet path associated with one of the multiple outlets, and a switch that operates to switch the outlet between being in fluid communication with the liquid outlet path and the gas outlet path. This allows a single outlet to be used to purge both liquid and gas from the chamber. In one arrangement there may be a separate independently controllable switch for each of the multiple outlets so that any one of the multiple outlets can be used to discharge liquid or gas. This feature may be of benefit where the apparatus is used in a non-terrestrial environment for applications, e.g. chemical separation processes, where it is desired to retain both the liquid and gas phases.

The apparatus may comprise a further sensing means to provide an indication of the presence of gas within the chamber. The further sensing means may comprise a pressure sensor to sense the pressure within the chamber; a pressure above a threshold pressure being indicative of the presence of gas within the chamber. The further sensing means may also or instead include a temperature sensor to provide an indication of the temperature of the fluid within the chamber. The output signals from the further sensing means may be used by the control means to determine the presence, and optionally volume, of gas within the chamber and in response to open a valve.

Similarly, the output of the further sensing means may be used by the control means to determine that the volume of gas within the chamber is equal or below a preferred volume, e.g. there is substantially no gas is in the chamber, and in response to close a valve.

The apparatus as variously as described above may be carried on an airborne or submarine platform.

In one application the apparatus may form part of a phase change cooling device, the chamber holding a coolant liquid heated within the chamber by a device or system to be cooled; the control means being arranged to control the multiple outlets in order to preferentially exhaust coolant gas from the chamber resulting from a phase change in the heated coolant fluid.

Where the apparatus is used on an airborne or submarine platform for uses as a phase change cooling device, a front end of the chamber i.e. that end nearest the front of the platform, may have an inside facing surface that is double convexly curved in order to encourage pockets and cavities of gas/vapour that formed on the surface to migrate radially outwards towards the outlets. A rear end of the chamber may also have an inside facing surface that is double convexly curved. The device to be cooled may be arranged in direct contact with the front side of the chamber.

The apparatus may be used as part of a closed-loop refrigeration system in which gas exhausted from the chamber may be re-liquefied by a condenser and stored, e.g. in the reservoir, for reintroduction into the chamber.

Figure 2:
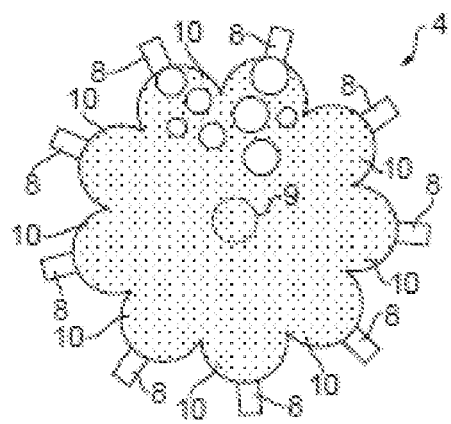

The invention will now be described with reference to the following figures in which:

FIG. 1 is a schematic of a phase change cooling apparatus comprising a gas-liquid separator chamber shown schematically in a side elevation section view; and FIG. 2 is a schematic of the gas-liquid separator chamber in front elevation.

With reference to the figures there is shown a phase change cooling apparatus 1 carried on an airborne or submarine platform 2 for cooling a device or system, hereafter referred to as device 3, which is also carried by the platform 2. The platform 2 has a forward end 2A and rear end 2B.

The cooling apparatus 1 comprises a gas-liquid separator chamber 4, a controller 5 and an accelerometer 6. The device 3 is arranged in direct contact with a wall of the chamber 4.

In use the chamber 4 is filled (optionally completely filled but more preferably largely filled) with a working liquid (coolent). Heat is conducted away from the device 3 through contact area 7 between the device 3 and chamber 4 into the working fluid causing a portion of the working fluid to change to a gas phase. In this way the device 3 can be maintained at a temperature equal to the boiling point of the working fluid within the chamber 4.

The chamber 4 has a plurality of outlets 8, of which only two are shown in FIG. 1, through which the gas phase is purged from the chamber 4, and an inlet 9 through which further working fluid can enter the chamber 4 to replenish that which is lost to the system through the outlets 8. The inlet 9 is positioned radially inward compared with the outlets 8 so that liquid can flow into the chamber 4 irrespective of its orientation.

As can be seen in FIG. 1, a portion of the chamber's inner volume lies radially outwards of the contact area 7. This ensures that gas/vapour that forms in the chamber 4 can be contained away from the vicinity of the contact area 7 so as not to inhibit heat transfer from device 3 into the working liquid.

As can be seen in FIG. 2, the plurality of outlets 8 are spaced circumferentially apart about the chamber 4 so that at least one lies near if not at the top of the chamber 4 irrespective of the orientation of the airborne platform and thus of the chamber 4 about axis X-X.

An inside facing surface of the chamber 4 is profiled to direct fluid towards an outlet. This helps to ensure gas pockets and vapour cavities that form in the chamber as a result of liquid-gas separation are guided to an outlet 8 so that they can be expelled from the chamber 4.

Both the front and rear inner faces 4A 4B of the chamber 4 are double convexly curved (curved about two perpendicular axes-like the inside of a sphere), as viewed from inside of the chamber 4, to encourage gas cavities/pockets that form against them to migrate radially outwards towards the outlets 8. This also has the effect of inhibiting gas pockets from collecting about the front inner face 4A next to the contact surface 7.

As shown in FIG. 2, the inner surface 10 of an outer circumferential portion of the chamber 4 is profiled to provide a separate channel associated with each outlet 8 to direct cavities/pockets towards the outlets 8.

The internal surface of the chamber 4 may be provided with a coating that is rough at the nano-meter scale to enhance heat transfer to the working fluid and promote nucleation. WO2014064450, which is hereby incorporated in its entirety by reference, describes such a coating and method of its application.

Associated with each outlet 8 is a valve 11 (see FIG. 1). Each valve 11 can be operated (e.g. through a solenoid actuator) by the controller 5 independently of the others in order to open or close its respective outlet 8.

The controller 5 can be implemented using one or more suitably programmed processors using techniques known to those skilled in the art.

The accelerometer 6, preferably a tri-axial accelerometer, and favourably implemented by a microelectromechanical system, provides an output signal to the controller 5 indicative of the magnitude and direction of acceleration of the chamber 4.

The output signal from the accelerometer 6 is used by the controller 5 to determine the relative orientation of the chamber 4. From the acceleration of the chamber 4 and its orientation the controller 5 determines the likely spatial orientation of the liquid and gas within the chamber 4 as a consequence of their differing physical characteristics, and thus which of the multiple outlets 8 lie immediately adjacent the gas phase. In use, the controller 5 opens the valves 11 of the outlets 8 determined to be immediately adjacent the gas phase in order to allow gas to escape from the chamber 4 preferentially to the liquid.

As the orientation and acceleration of the chamber 4 changes, the controller 5 determines any changes in the spatial orientation of gas relative to the outlets 5 and acts to open and/or close outlets to ensure only those immediately adjacent the gas phase are open.

The apparatus may comprise a temperature sensor 12A arranged to sense the temperature of the fluid within the chamber 4 and/or a pressure sensor 12B to sense the fluid pressure within the chamber 4. The outputs from the temperature and/or pressure sensors 12A 12B are used by the controller 5 to infer the existence of gas phase or, more preferably, volume of gas phase within the chamber (e.g. through an increase in pressure/temperature within the chamber beyond a threshold) and therefore only allow valves 11 to open when it is inferred that the volume of gas within the chamber 4 is above a preferred volume (or present in any volume if operating a chamber completely filled with liquid). Similarly, this arrangement can be used to determine when, as a result of gas having been expelled from the chamber 4 through one or more outlets 8, the volume of gas has fallen to within a preferred range (or expelled completely) and to close valves 11 in response.

The inlet 9 is in fluid communication with a reservoir 13 that holds working fluid in the liquid phase. A piston 14 biased with a spring 15, acts against the fluid in the reservoir 13 pressurising the fluid in the chamber 4. This ensures that fluid lost within the chamber 4 via the outlets 8 is replenished from the reservoir 13 to maintain the boiling point of the fluid within the chamber 4.

Fluid can flow in either direction between the chamber 4 and reservoir 13. This allows the fluid to be contained in the chamber 4 at a relative constant pressure notwithstanding an increase in temperature of the chamber 4.

In a variant embodiment, gas/vapour that it purged from the chamber 4 could be recycled by passing through a condenser (not shown) to cool back to a liquid that can then be used to replenish the cooling chamber, e.g. by channelling the resulting liquid from the condenser back into the reservoir 13.

Means other than a spring 15 biased piston 14 may be used to pressurise the fluid. For example, the piston 14 could be operated by an actuator, alternatively the reservoir 13 could be pressurised through implementation of a diaphragm pressure tank or bladder pressurised tank. In these arrangements the pressure within the chamber 4 can be controlled on the fly by varying the magnitude of the force against the liquid within the reservoir 13 to control/alter the boiling point of the working fluid within the chamber 4. This can be undertaken based on the pressure values within the chamber 4 as determined from pressure sensor 12B.

In a variant embodiment, the chamber 4 may comprise vents arranged so that at least one vent lies near the top of the chamber 4 irrespective of the orientation of the airborne platform about any axis. In such an embodiment the inside of chamber 4 may be generally spherical or spheroid in form.

The invention claimed is:

1. A cooling device comprising:
   a gas-liquid separator chamber for holding a coolant that separates into a gas phase and liquid phase within the gas-liquid separator chamber through absorbing heat from an object to be cooled, the chamber including multiple spaced apart outlets;
   sensing means for providing an output indicative of orientation and/or acceleration of the chamber; and
   control means for using the output of the sensing means to determine an indication of spatial arrangement of a separated liquid phase and gas phase of a gas-liquid mixture within the chamber relative to the outlets, the control means being configured to selectively open one or more of the multiple outlets to allow one of the liquid phase or gas phase to escape from the chamber in preference to the other.

2. The cooling device according to claim 1, wherein the sensing means comprises:
   an accelerometer.

3. The cooling device according to claim 2, wherein the chamber comprises:
   an inlet fora fluid.

4. The cooling device according to claim 3, comprising:
   a liquid reservoir in fluid communication with the inlet.

5. The cooling device according to claim 4, comprising:
   means for feeding fluid under pressure from the reservoir into the chamber via the inlet.

6. The cooling device according claim 5, wherein an inside facing surface of the chamber is profiled to direct fluid towards an outlet.

7. The cooling device according to claim 6, wherein the inside facing surface of the chamber is profiled to provide, for each of the multiple outlets, a channel to guide fluid towards the outlet.

8. The cooling device according to claim 7, in combination with and an airborne or submarine platform.

9. The cooling device according to claim 1, wherein the chamber comprises:
   an inlet fora fluid.

10. The cooling device according to claim 1, wherein an inside facing surface of the chamber is profiled to direct fluid towards an outlet.

11. The cooling device according to claim 1, in combination with and an airborne or submarine platform.

12. A method of separating a gas phase of a coolant from a liquid phase of a coolant
   within a gas-liquid separator chamber of a cooling device, the chamber including multiple spaced apart outlets;
   the method comprising:
   using sensing means to determine orientation and/or acceleration of the chamber to determine a spatial arrangement of liquid and gas within the chamber relative to the outlets; and
   based on the determined spatial arrangement of the liquid and gas within the chamber relative to the outlets, selecting an outlet to open to allow one of the liquid and gas to escape from the chamber in preference to the other.

13. The method of claim 12 comprising:
   Placing the chamber and sensing means on an airborne or submarine platform.

* * * * *